US 12,175,282 B2

(12) United States Patent
Anthony et al.

(10) Patent No.: US 12,175,282 B2
(45) Date of Patent: Dec. 24, 2024

(54) SYSTEM, METHOD, AND APPARATUS FOR SELECTING A CPU OR AN ACCELERATOR TO PREPROCESS DATA BASED ON MONITORED INFORMATION

(71) Applicant: HUAWEI TECHNOLOGIES CO., LTD., Guangdong (CN)

(72) Inventors: Anthony Anthony, Markham (CA); Junhan Hu, Richmond Hill (CA); Xun Xue, Markham (CA); Robin Dawn Grosman, Markham (CA); Nattavut Sutyanyong, Thornhill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 478 days.

(21) Appl. No.: 17/183,448

(22) Filed: Feb. 24, 2021

(65) Prior Publication Data
US 2022/0269528 A1    Aug. 25, 2022

(51) Int. Cl.
G06F 9/48    (2006.01)
G06F 9/50    (2006.01)
G06N 3/08    (2023.01)

(52) U.S. Cl.
CPC .......... *G06F 9/4843* (2013.01); *G06F 9/5027* (2013.01); *G06N 3/08* (2013.01)

(58) Field of Classification Search
CPC ...... G06F 9/4843; G06F 9/5027; G06F 9/505; G06F 2209/5018; G06F 2209/508; G06F 2209/509; G06N 3/08
See application file for complete search history.

(56) References Cited

U.S. PATENT DOCUMENTS

| 11,182,205 B2* | 11/2021 | Rosen ..................... G06F 9/505 |
| 2004/0098200 A1* | 5/2004 | Wentland ................ G06F 18/40 |
| | | 702/2 |

(Continued)

FOREIGN PATENT DOCUMENTS

| CN | 203606951 U | * | 5/2014 | |
| CN | 104376082 A | * | 2/2015 | ........... G06F 16/258 |

(Continued)

OTHER PUBLICATIONS

Tang, CN110738067A Description Translation, Jan. 31, 2020, [database online], [retrieved on Aug. 24, 2023] Retrieved from Espacenet using Internet <URL:https://worldwide.espacenet.com/publicationDetails/description?CC=CN&NR=110738067A&KC=A&FT=D&ND=3&date=20200131&DB=&locale=en_EP>, pp. 1-26 (Year: 2020).*

(Continued)

*Primary Examiner* — Meng Ai T An
*Assistant Examiner* — Hsing Chun Lin
(74) *Attorney, Agent, or Firm* — BCF LLP

(57) ABSTRACT

The disclosed systems and methods for intelligent heterogeneous computation directed to receiving monitoring data and a set of training data, wherein the monitoring data includes an occupancy rate of a preprocessed data queue and a utilization factor of accelerating devices, generating a resource computation job list in accordance with the monitoring data, forwarding jobs, in the resource computation job list to be executed on a central processing unit (CPU), to a CPU worker queue, forwarding control messages to the CPU worker queue, wherein the control messages are associated with jobs in the resource computation job list to be executed on the accelerating devices, and executing, by the accelerating devices, jobs in the resource computation job list to be executed on the accelerating devices.

11 Claims, 10 Drawing Sheets

(56) References Cited

U.S. PATENT DOCUMENTS

| | | | |
|---|---|---|---|
| 2014/0089720 A1* | 3/2014 | Schmit | G06F 13/42 |
| | | | 713/500 |
| 2016/0034809 A1 | 2/2016 | Trenholm et al. | |
| 2019/0332422 A1 | 10/2019 | Liu et al. | |
| 2020/0042362 A1 | 2/2020 | Cui et al. | |
| 2020/0151613 A1* | 5/2020 | Yoo | G06F 11/3466 |
| 2020/0159589 A1 | 5/2020 | Capes et al. | |
| 2020/0174840 A1 | 6/2020 | Zhao et al. | |
| 2020/0210228 A1* | 7/2020 | Wu | G06F 9/4881 |
| 2021/0019211 A1* | 1/2021 | Sghiouer | G06F 11/34 |
| 2021/0042155 A1 | 2/2021 | Wang et al. | |
| 2023/0105476 A1* | 4/2023 | Anil | G06F 9/5066 |
| | | | 718/102 |

FOREIGN PATENT DOCUMENTS

| | | | | |
|---|---|---|---|---|
| CN | 110738067 A | * | 1/2020 | G06K 7/1413 |
| CN | 110750342 A | * | 2/2020 | |
| CN | 111262782 A | * | 6/2020 | H04L 45/32 |
| CN | 111447447 A | * | 7/2020 | H04N 19/103 |
| KR | 20200056818 A | * | 5/2020 | |
| WO | WO-2022052523 A1 | * | 3/2022 | G05B 19/406 |

OTHER PUBLICATIONS

Yan et al. CN111262782A Description Translation, Jun. 9, 2020, [database online], [retrieved on Aug. 24, 2023] Retrieved from Espacenet using Internet <URL:https://worldwide.espacenet.com/publicationDetails/description?CC=CN&NR=111262782A&KC=A&FT=D&ND=3&date=20200609&DB=&locale=en_EP>, pp. 1-15 (Year: 2020).*

Guo et al, CN111447447A Description Translation, Jul. 24, 2020, [database online], [retrieved on Aug. 24, 2023] Retrieved from Espacenet using Internet <URL:https://worldwide.espacenet.com/publicationDetails/description?CC=CN&NR=111447447A&KC=A&FT=D&ND=3&date=20200724&DB=&locale=en_EP>, pp. 1-19 (Year: 2020).*

Luo, CN203606951U Description Translation, May 21, 2014 [database online], [retrieved on Aug. 24, 2023] Retrieved from Espacenet using Internet <URL:https://worldwide.espacenet.com/publicationDetails/description?CC=CN&NR=203606951U&KC=U&FT=D&ND=3&date=20140521&DB=&locale=en_EP>, pp. 1-14 (Year: 2014).*

Zhang et al. CN110750342A Description Translation, Feb. 4, 2020, [database online], [retrieved on Aug. 24, 2023] Retrieved from Espacenet using Internet <URL:https://worldwide.espacenet.com/publicationDetails/description?CC=CN&NR=110750342A&KC=A&FT=D&ND=3&date=20200204&DB=&locale=en_EP>, pp. 1-32 (Year: 2020).*

Liu et al. CN104376082A Description Translation, Feb. 25, 2015, <https://worldwide.espacenet.com/publicationDetails/description?CC=CN&NR=104376082A&KC=A&FT=D&ND=3&date=20150225&DB=&locale=en_EP>, pp. 1-6 (Year: 2015).*

Kim et al. KR20200056818A Description Translation, May 25, 2020, <https://worldwide.espacenet.com/publicationDetails/description?CC=KR&NR=20200056818A&KC=A&FT=D&ND=3&date=20200525&DB=&locale=en_EP>, pp. 1-10 (Year: 2020).*

Qu, WO2022052523A1 Description Translation, Mar. 17, 2022, <https://worldwide.espacenet.com/publicationDetails/description?CC=WO&NR=2022052523A1&KC=A1&FT=D&ND=3&date=20220317&DB=&locale=en_EP>, pp. 1-15 (Year: 2022).*

International Search Report and Written Opinion issued in co-pending International application No. PCT/CN2022/077340 on May 20, 2022.

* cited by examiner

SYSTEM, METHOD, AND APPARATUS FOR SELECTING A CPU OR AN ACCELERATOR TO PREPROCESS DATA BASED ON MONITORED INFORMATION

CROSS-REFERENCE TO RELATED APPLICATIONS

This is the first application filed for the instantly disclosed technology.

TECHNICAL FIELD

The present disclosure generally relates to artificial intelligence (AI) and, in particular, to a system, and a method for intelligent heterogeneous computation.

BACKGROUND

In the world of artificial intelligence (AI), a neural network/model is trained by repeatedly feeding it with a training data set. After each pass of the training data set, the neural network/model is adjusted and becomes more accurate. A single pass of the training data set through the neural network/model during a training run is referred to as an epoch. For example, if the neural network/model is for images classification, then to train it there may be 1.5 million images to train against. In such a training run, each pass through the training dataset (1.5 million images in this example) is called an epoch. In machine learning, a neural network/model will not become accurate until it has been run through many epochs worth of training.

In many AI training frameworks, prior to training, the training dataset is preprocessed. Also, in various AI training frameworks, the training dataset preprocessing and training is implemented as pipelines. While heterogeneous computing is very commonly adapted by AI training pipelines, it is still not a common practice in the AI data preprocessing pipelines. One of the reasons being the resource contention between training pipeline and data pipeline.

Certain existing AI training frameworks such as Tensorflow provides tf.data.Dataset class which perform CPU operations only, PyTorch provides torchvision.transform class which only supports CPU data preprocessing (PyTorch supports explicit GPU tensor operations with support a small subset of basic tensor transformation), and NVIDIA DALI supports a large range of GPU data preprocessing operator, but the operator execution device (CPU or GPU) has to be specified by user ahead of time.

With this said, the data preprocessing tasks in the existing AI training framework has been inflexible in terms of which computation resources it requires to run each specific task. Thus, there is an interest in developing systems and methods that offer increased flexibility in computation resource utilization to enhance the over all performance of an AI training framework.

SUMMARY

The embodiments of the present disclosure have been developed based on developers' appreciation of shortcomings associated with the prior art namely, inflexible AI training framework in terms of efficient utilization of available computation resources.

In accordance with the first broad aspect of the present disclosure, there is provided a method comprising receiving monitoring data and a set of training data (not including an empty set), wherein the monitoring data includes an occupancy rate of a preprocessed data queue and a utilization factor of accelerating devices; generating a resource computation job list in accordance with the monitoring data; forwarding jobs, in the resource computation job list to be executed on a central processing unit (CPU), to a CPU worker queue; forwarding control messages to the CPU worker queue, wherein the control messages are associated with jobs in the resource computation job list to be executed on the accelerating devices; and executing, by the accelerating devices, jobs in the resource computation job list to be executed on the accelerating devices.

In accordance with other aspects of the present disclosure, the method, wherein generating the resource computation job list includes: creating an empty job list; traversing a list of tensor operations to be performed on the set of training data; creating a job to be executed by the CPU, if at least one of the following is true: an operation in the list of tensor operation is specified to be performed by the CPU, the utilization factor of accelerating devices is above a first threshold, or the occupancy rate of the preprocessed data queue is above a second threshold; creating a job to be executed by the accelerating device, if the utilization factor of accelerating devices is below the first threshold and the occupancy rate of the preprocessed data queue is below the second threshold; and updating the empty job list in accordance with jobs created to be executed by the CPU and the accelerating devices to generate the resource computation job list.

In accordance with other aspects of the present disclosure, the method, further comprises: extracting an item from the CPU worker queue; if the extracted item is a job, processing the extracted item by the CPU, the processing includes applying one or more operations on the training data specified in the job and generating processed training data; if the extracted item is a control message, receiving an associated processed training data from the accelerated device; combining the training data processed by the CPU and the accelerated device; and forwarding the processed and combined training data to the preprocessed data queue to make the processed and combined training data available for other processing units In accordance with other aspects of the present disclosure, the method, wherein the job includes a portion of training data and one or more operations to be performed on the portion of training data.

In accordance with other aspects of the present disclosure, the method, wherein the resource computation job list includes a list of jobs and the corresponding computational resources onto which the jobs are to be executed.

In accordance with other aspects of the present disclosure, the method, wherein the computational resource includes CPU and accelerating devices.

In accordance with other aspects of the present disclosure, the method, wherein the accelerating devices includes one or more of graphic processing unit (GPU), digital signal processor (DSP), neural processing unit (NPU), tensor processing unit (TPU), vision processing unit (VPU), physical neural network (PNN), field-programmable gate array (FPGA), application-specific integrated circuits (ASIC), and/or complex programmable logic devices (CPLD).

In accordance with other aspects of the present disclosure, the method, wherein the occupancy rate is a temporal average of a number of preprocessed training data samples in the preprocessed data queue.

In accordance with other aspects of the present disclosure, the method, wherein the CPU and accelerating devices process the training data in parallel.

In accordance with the second broad aspect of the present disclosure, there is provided a system comprising: a processor, accelerating devices, at least one central processing unit (CPU), a preprocessing data queue, a CPU worker queue, and a non-transitory computer-readable medium comprising instructions; the processor upon executing the instructions, being configured to cause the processor to: receive monitoring data and a set of training data, wherein the monitoring data includes an occupancy rate of a preprocessed data queue and a utilization factor of accelerating devices; generate a resource computation job list in accordance with the monitoring data; forward jobs, in the resource computation job list to be executed on the CPU, to a CPU worker queue; forward control messages to the CPU worker queue, wherein the control messages are associated with jobs in the resource computation job list to be executed on the accelerating devices; and instructing the accelerating devices to execute jobs in the resource computation job list to be executed on the accelerating devices In accordance with other aspects of the present disclosure, the system, wherein generating the resource computation job list includes: creating an empty job list; traversing a list of tensor operations to be performed on the set of training data; creating a job to be executed by the CPU, if at least one of the following is true: an operation in the list of tensor operation is specified to be performed by the CPU, the utilization factor of accelerating devices is above a first threshold, or the occupancy rate of the preprocessed data queue is above a second threshold; creating a job to be executed by the accelerating device, if the utilization factor of accelerating devices is below the first threshold and the occupancy rate of the preprocessed data queue is below the second threshold; and updating the empty job list in accordance with jobs created to be executed by the CPU and the accelerating devices to generate the resource computation job list.

In accordance with other aspects of the present disclosure, the system, further comprises: extracting, by the CPU, an item from the CPU worker queue; if the extracted item is a job, processing the extracted item by the CPU, the processing includes applying one or more operations on the training data specified in the job and generating processed training data; if the extracted item is a control message, receiving, by the CPU, an associated processed training data from the accelerated device; combining, by the CPU, the training data processed by the CPU and the training data processed by the accelerated device; and forwarding, by the CPU, the processed and combined training data to the preprocessed data queue to make the processed and combined training data available for other processing units.

In accordance with other aspects of the present disclosure, the system, wherein the job includes a portion of training data and one or more operations to be performed on the portion of training data.

In accordance with other aspects of the present disclosure, the system, wherein the resource computation job list includes a list of jobs and the corresponding computational resources onto which the jobs are to be executed.

In accordance with other aspects of the present disclosure, the system, wherein the computational resource includes CPU and accelerating devices.

In accordance with other aspects of the present disclosure, the system, wherein the accelerating devices includes one or more of graphic processing unit (GPU), digital signal processor (DSP), neural processing unit (NPU), tensor processing unit (TPU), vision processing unit (VPU), physical neural network (PNN), field-programmable gate array (FPGA), application-specific integrated circuits (ASIC), and/or complex programmable logic devices (CPLD).

In accordance with other aspects of the present disclosure, the system, wherein the occupancy rate is a temporal average of a number of preprocessed training data samples in the preprocessed data queue.

In accordance with other aspects of the present disclosure, the system, wherein the CPU and accelerating devices process the training data in parallel.

BRIEF DESCRIPTION OF THE FIGURES

Further features and advantages of the present disclosure will become apparent from the following detailed description, taken in combination with the appended drawings, in which.

Figure 1:
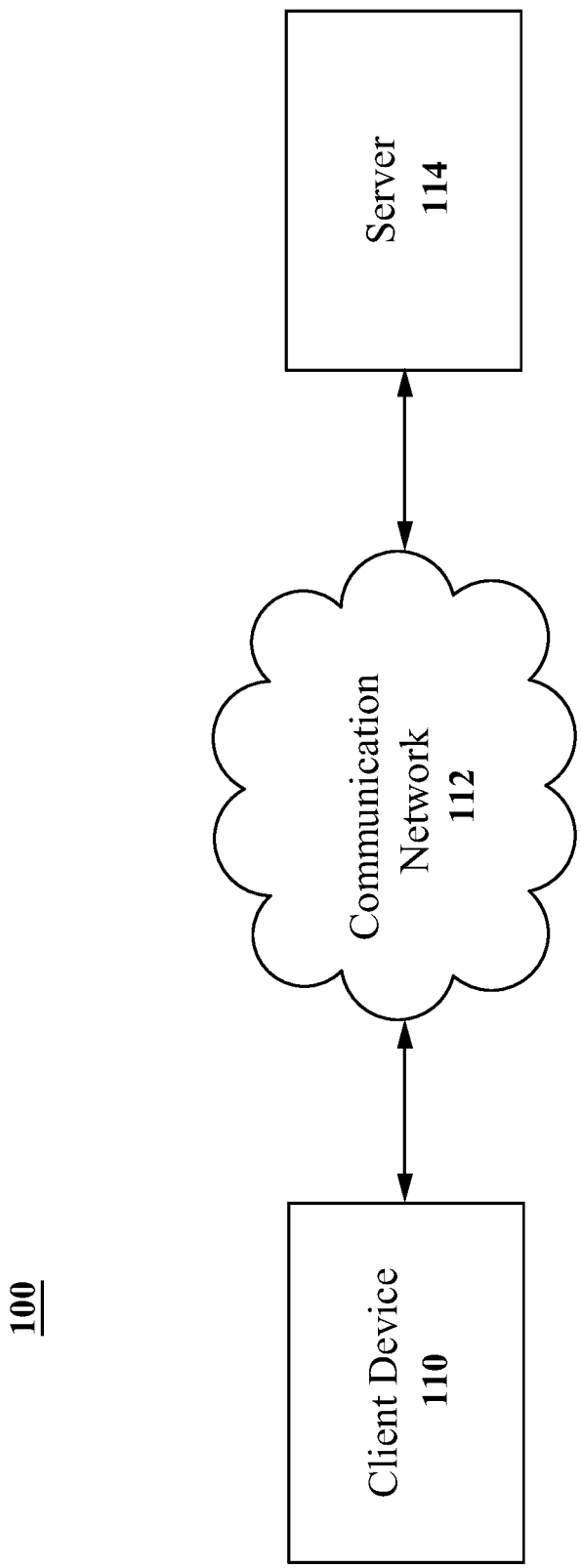
FIG. 1 depicts an environment for an intelligent heterogeneous computing system associated with an artificial intelligence (AI) training framework, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and method for intelligent heterogeneous computation.

Unless otherwise defined or indicated by context, all technical and scientific terms used herein have the same meaning as commonly understood by one of ordinary skill in the art to which the described embodiments appertain to.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

In the context of the present disclosure, unless expressly indicated otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present disclosure, the term "Training" refers to a process of repeatedly feeding data into an AI training framework until the model can predict relevant outputs with a high accuracy. In one example, the data that is trained comes in the form of labelled data. For example, if the data is a series of images, then the images will have labels to go with them (i.e., "dog", "cat", "tree", etc.). In another example, the data may be without any labels or at least partially labelled.

In the context of the present disclosure, the term "Tensor" refers to an object (or mathematical representation or format) that stores the data for one object that is being trained on. For example, a tensor may hold one jpg image. The tensor may contain meta-data that describes the object, as well as the data of the object itself.

In the context of the present disclosure, the term "Epoch" refers to a single pass through the collection of data during a training execution run. For example, if the neural network/model is for classification of images, then to train it there may be millions of images to train against. In such a training run, each pass through the dataset (millions of images in this example) is called an epoch.

In the context of the present disclosure, the "AI Training Framework" refers to a collection of software tools that may execute the task of reading the data, feeding it into the neural network/model for training, and driving the training logic to adjust the neural network/model until a certain accuracy is achieved. The AI Training Framework may provide operations that can change the data and present it in different ways. For example, the AI Training Framework may randomize the data, invoke transforms against the data like crop/resize images, filter certain data, and so forth.

In the AI Training Framework, a set of operations may be executed as a AI training pipeline. To provide an analogy, an AI training pipeline may be like an assembly line at a car manufacturing plant where each worker is assigned a specific task to perform. Each worker takes some input, execute their task, and then pass the work on to the next worker. There may be a channel that connects each worker for passing input and output data to each worker. The AI training pipelines may be configured to operate in similar manner. The workers are often called "nodes" in the AI pipelines.

In the context of the present disclosure, the term "Node" refers to as any processing element capable of processing an input data and generating output data, storing the input data and/or output data, communicating with other nodes, client devices, servers or the like. Without limiting the scope of the present disclosure, a node may include one or more processors, memory elements, and other required components.

Each node in the AI pipeline may be configured to receive input(s), perform a operation/transformation on the data, and then produce an output for the next operator node to process. The AI pipeline allows parallelism (operations can be performed non-sequentially, perhaps simultaneously) and the end node in a highly parallel AI pipeline(s) does not need to wait for data. The data is to be constantly flowing through the operations being executed by parallel nodes in the AI pipeline.

In the context of the present disclosure, "communication/communicate" between two nodes, a node and a processor/controller, a node and a server, a pipeline and a server, any two modules, any two software components, or any two hardware components, refers to as the exchange, transfer, sending, receiving, sharing or the like of information, request, data, or the like without limiting the scope of present disclosure.

In the context of the present disclosure, the terms "Transform/transformation" and/or "Augmentations" refer to operations that are executed against the data to modify the original properties of the data. For example, in image processing, the non-limiting examples of transformation and/or augmentations may include flip, or rotate, or crop, or the like. An AI training framework typically provides the ability to inject augmentation and transform operations into the AI pipeline.

In the context of the present disclosure, the term "Heterogeneous computing" refers to an AI pipeline using computation resources beyond CPU for the data preprocessing and training processes. Such resources may be referred to as accelerating devices and may include one or more of graphic processing unit (GPU), digital signal processor (DSP), neural processing unit (NPU), tensor processing unit (TPU), vision processing unit (VPU), physical neural network (PNN), field-programmable gate array (FPGA), application-specific integrated circuits (ASIC), complex programmable logic devices (CPLD), or the like. Computing AI related workloads are usually much faster on the accelerating devices than on CPUs, because of the architectural advantages of the accelerating devices.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and method for intelligent heterogeneous computation.

In particular, FIG. 1 depicts an environment 100 for an intelligent heterogeneous computing system for AI training data preprocessing pipeline based an artificial intelligence (AI) training framework, in accordance with various embodiments of the present disclosure. The environment 100 may include multiple client devices 110 (for the purpose of simplicity only one client device 110 has been illustrated) located and different geographic locations that are configured to communicate with each other via a communication network 112 and a server 114. In certain embodiments, multiple client devices 110 may be associated with individual users (such as, users of personal computers, laptops, desktops, or the like) or a part of network (such as, client devices in an organization, etc.).

Figure 2A:
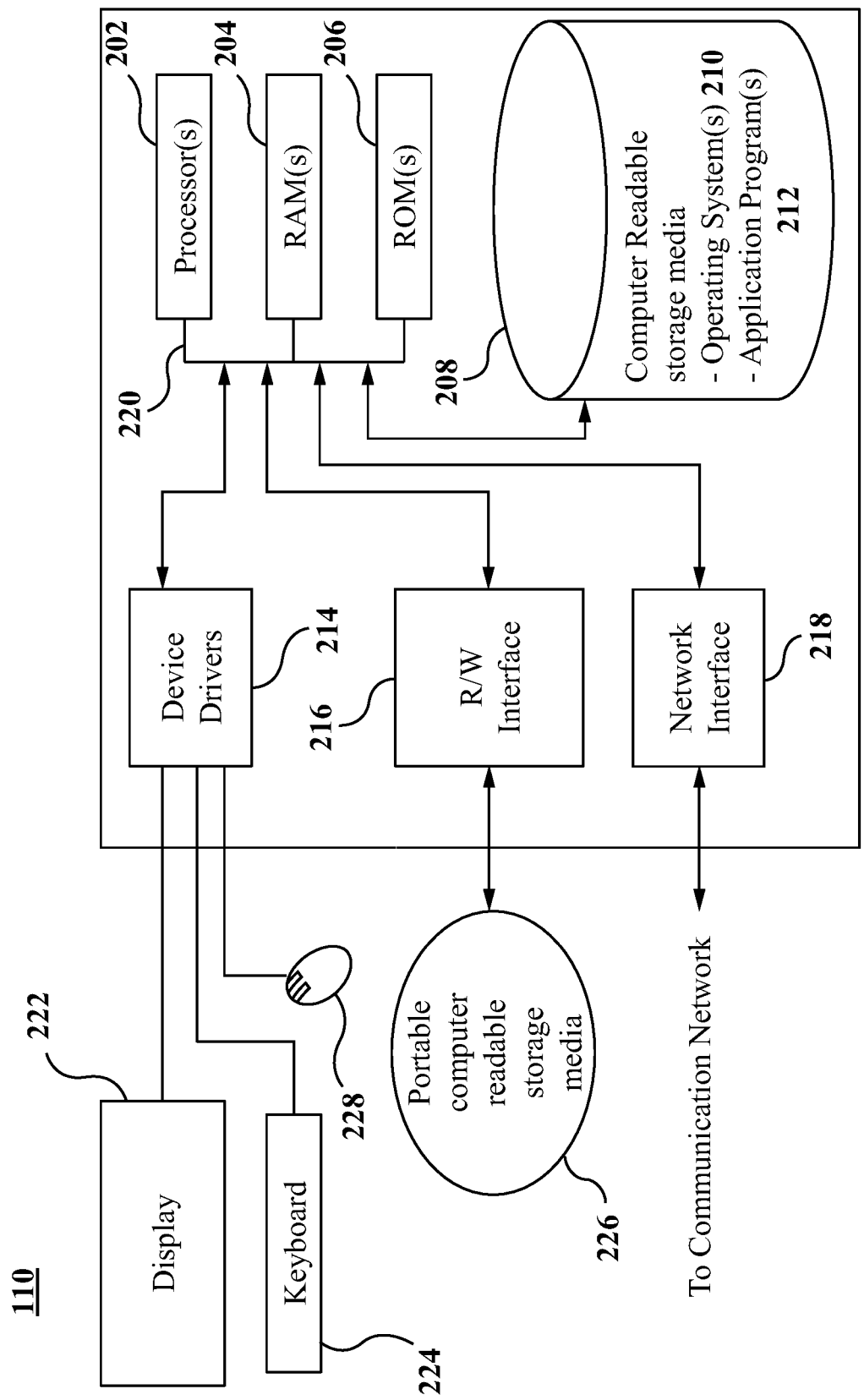
FIG. 2A depicts a high-level functional block diagram of a client device of the environment of FIG. 1, in accordance with various embodiments of the present disclosure.

FIG. 2A depicts a high-level block diagram of components of client device 110, in accordance with various embodiments of the present disclosure. It should be appreciated that FIG. 2A provides only an illustration of one implementation of client device 110 and does not imply any limitations with regard to the environments in which different embodiments may be implemented. Various modifications to the depicted environment may be done to implement client device 110 without departing from the principles presented herein. The client device 110 may be a server, a desktop computer, a laptop computer, or any device that may be configured to implement the present technology, as should be understood by a person skilled in the art.

As shown, client device 110 employs one or more different type of processors 202, one or more computer-readable random access memories (RAMs) 204, one or more computer-readable read only memories (ROMs) 206, one or more computer-readable storage media 208, device drivers 214, a read/write (R/W) driver interface 216, a network interface 218, all interconnected over a communication fabric 220. The communication fabric 220 may be implemented by any architecture designed for communicating data and/or control information between processors (such as microprocessors, communications and network processors, etc.), system memory, peripheral devices, and any other hardware components within a system.

The processor 202 of client device 110 may include one or more of a CPU, an accelerator, a microprocessor, a GPU, an NPU, an ASIC, a FPGA, a dedicated logic circuitry, a dedicated artificial intelligence processor unit, or combinations thereof.

One or more operating systems 210 and one or more application programs 212 (examples of application programs may include programming instructions) are stored on one or more of computer-readable storage media 208 for execution by one or more of the processors 202 via one or more of respective RAMs 204 (which typically include a cache memory). In the illustrated embodiment, each of the computer-readable storage media 208 maybe embodied as a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 216 reads from and writes to one or more portable computer-readable storage media 226. The application programs 212 may be related to the intelligent heterogeneous computing system and stored on one or more of portable computer-readable storage media 226, read via the respective R/W driver interface 216 and loaded into the respective computer-readable storage media 208.

Further, network interface 218 may be based on a TCP/IP adapter card or wireless communication adapter (such as a wireless communication adapter using OFDMA technology). The application programs 212 on client device 110 may be downloaded to client device 110 from an external computer or external storage device via a communication network (for example, the Internet, a local area network or other wide area network or wireless network) and network interface 218. From network interface 218, application programs 212 may be loaded onto the computer-readable storage media 208. The client device 110 may connect to routers, firewalls, switches, gateway computers and/or edge servers of the communication network using copper wires, optical fibers, wireless transmission, and the like.

The client device 110 may also include a display screen 222, a keyboard or keypad 224, and a computer mouse or touchpad 228. The device drivers 214 may interface with display screen 222 for imaging, with the keyboard or the keypad 224, with computer mouse or touchpad 228, and/or with display screen 222 (which may be a touch sensitive display) for alphanumeric character entry and user selections. The device drivers 214, R/W driver interface 216 and network interface 218 may comprise hardware and software (stored on the computer-readable storage media 208 and/or the ROM 206).

Figure 2B:
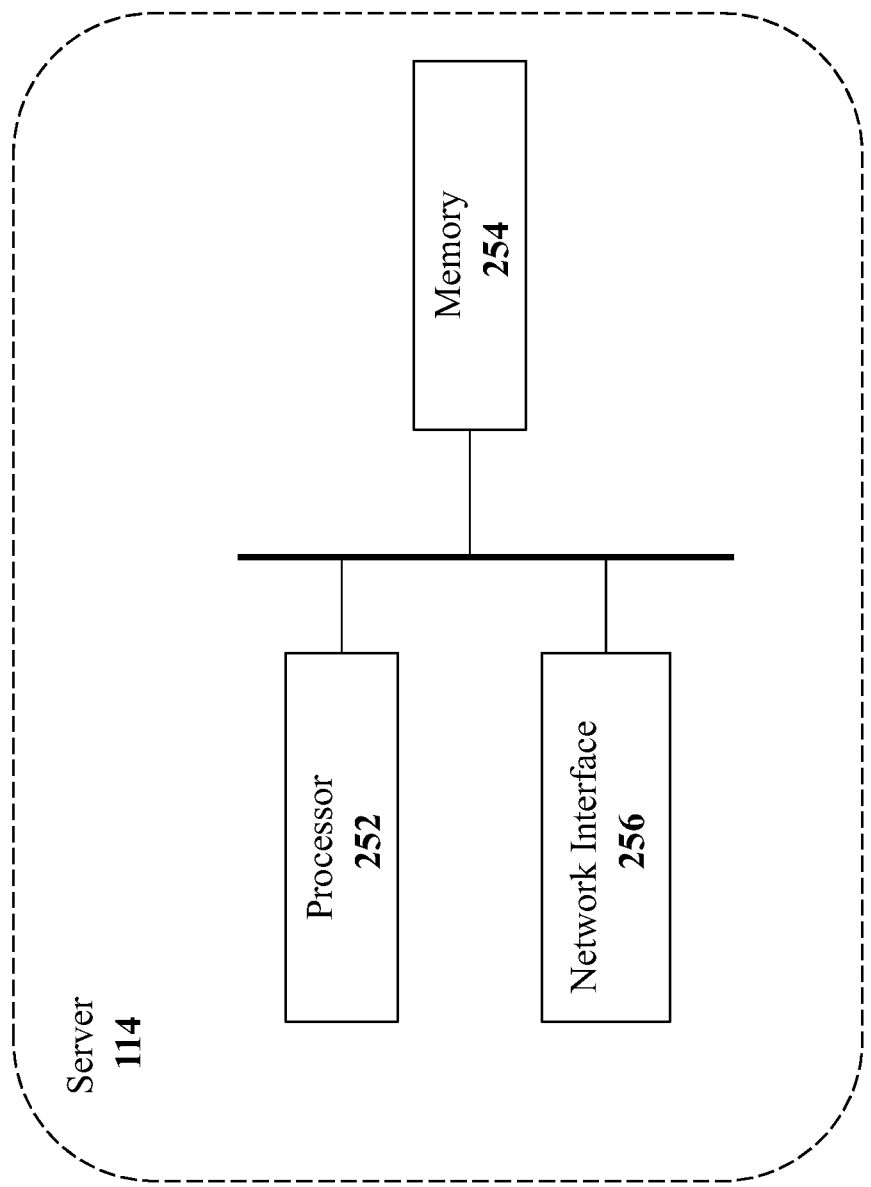
FIG. 2B depicts a high-level functional block diagram of the server of the environment of FIG. 1, in accordance with various embodiments of the present disclosure.

FIG. 2B depicts a high-level functional block diagram of server 114 of environment 100 of FIG. 1, in accordance with various embodiments of the present disclosure. In the depicted embodiment, server 114 may be embodied as a physical machine (e.g., a physical server) or virtual machine (e.g., a virtual server) that executes application programs to enable client devices 110 to communicate with server 114. The server 114 may include a processor 252, a memory 254, and a network interface 256. It is to be noted that the server 114 may include other components but have not been illustrated for the purpose of simplicity.

The processor 252 of server 114 may include one or more of a CPU, an accelerator, a microprocessor, a GPU, an ASIC, a FPGA, a dedicated logic circuitry, a dedicated artificial intelligence processor unit, or combinations thereof.

The memory 254 may include volatile memory (e.g., RAM) and non-volatile or non-transitory memory (e.g., a flash memory, magnetic storage, and/or a ROM). The non-transitory memory(ies) stores a platform that controls the overall operation of server 114. The platform, when executed by processor 252, implements application programs related to the intelligent heterogeneous computing system.

The network interface 256 may include one or more wireless transceivers configured for wireless communications with communication network 112, or one or more network adaptors configured for wired communications with communication network 112. In general, network interface 256 may be configured to correspond with the network architecture of that is used to implement a link for communications between server 114 and communication network 112. In certain embodiments, network interface 256 may be implemented in a similar manner as network interface 218 has been implemented.

It is to be noted that server 114 is shown as a standalone computer. However, the implementation of various other embodiments of the present disclosure may include any client-server model where client devices may run a client version of the application programs related to the intelligent heterogeneous computing system. Other examples of server 114 may include a distributed computing system that runs the server version of the application programs related to the intelligent heterogeneous computing system, a virtual machine (or virtual machines) instantiated by the infrastructure of a public or private cloud, or a cloud service provider that provides the application programs related to the intelligent heterogeneous computing system as a service (SaaS). Such implementations or any other similar implementation should not limit the scope of the present disclosure.

Figure 3:
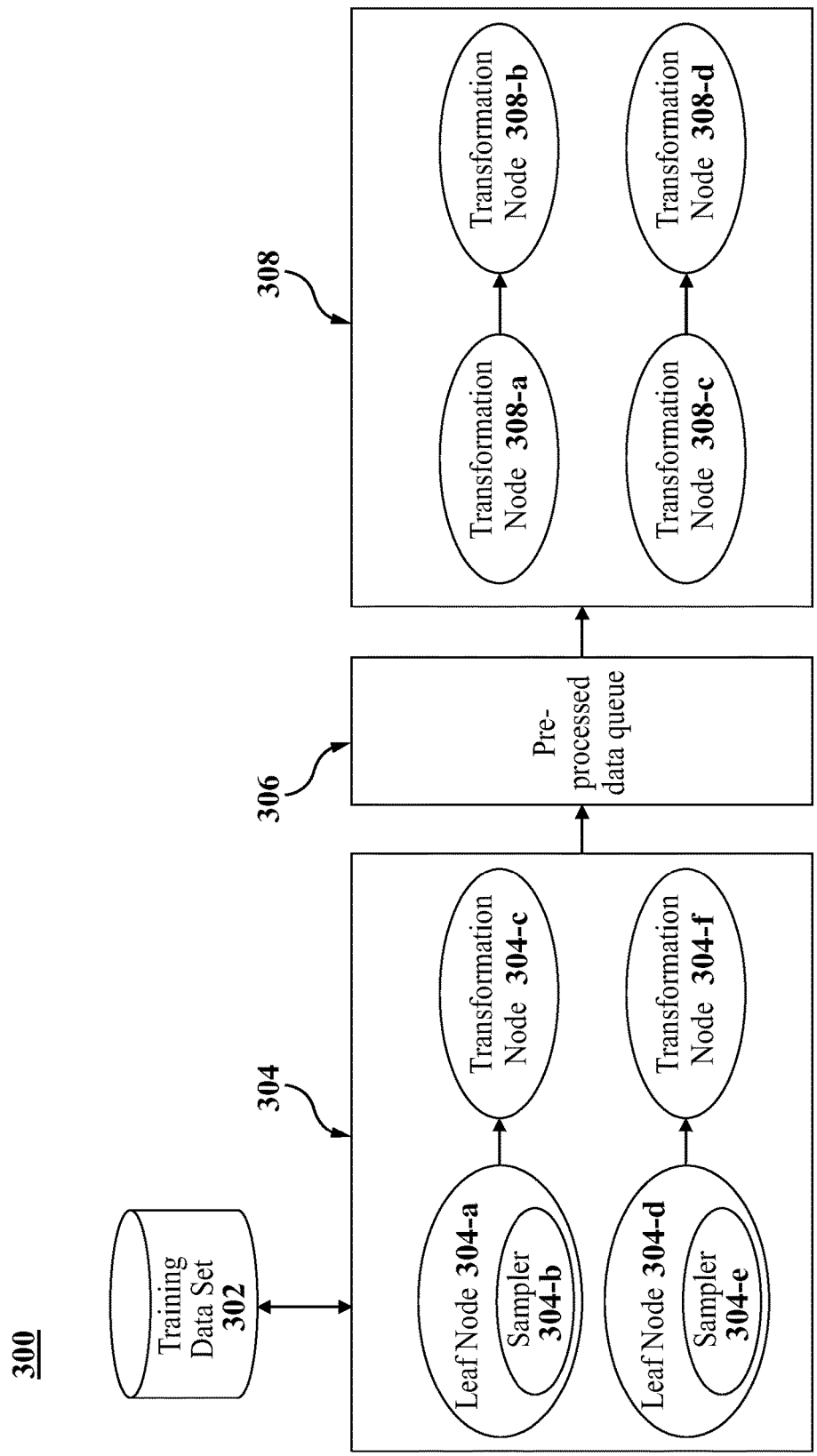
FIG. 3 (Prior Art) illustrates a high-level functional block diagram of a conventional AI training framework.

As noted above, to preprocess the training data and train a neural network/model, an AI training framework may execute various sets of operations as AI pipelines. FIG. 3 (Prior Art) illustrates a high-level functional block diagram of a conventional AI training framework 300. As shown, conventional AI training framework 300 includes a training data set 302 a training data preprocessing pipeline 304, a preprocessed data queue 306, and an AI training pipeline 308.

The training data preprocessing pipeline 304 includes a plurality of pipelines and each pipeline may include a leaf node and transformations nodes. By way of example, data preprocessing pipeline 304 includes two pipelines, the first pipeline includes a leaf node 304-*a*, and a transformation node 304-*c* and the second pipeline includes a leaf node 304-*d* and a transformation node 304-*f*. The leaf node 304-*a* further includes a sampler 304-*b* and leaf node 304-*d* further includes a sampler 304-*e*.

The training data set includes training data samples to be preprocessed by training data preprocessing pipeline 304. The leaf nodes 304-*a* and 304-*d* communicates with training data set 302 to fetch the training data to be preprocessed. The sampler 304-*b*, and 304-*e* are configured to shard the training data prior to preprocessing. The transformation nodes 304-*c* and 304-*f* are configured to preprocess the sharded training data samples and store the preprocessed in preprocessed data queue 306. The AI training pipeline 308 fetches the preprocessed data from preprocessed data queue 306 to train a neural network model.

It is to be noted that the data preprocessing tasks in the existing AI training framework 300 has been very inflexible in terms of which computation resources it requires to run for each specific task. Commonly, all the preprocessing tasks are either all performed by a CPU or preconfigured to run on specific GPU prior to runtime.

However, these existing mechanisms may result in suboptimal CPU and other accelerating device resource utilization. In certain embodiments, the accelerating devices may include one or more of graphic processing unit (GPU), digital signal processor (DSP), neural processing unit (NPU), tensor processing unit (TPU), vision processing unit (VPU), physical neural network (PNN), field-programmable gate array (FPGA), application-specific integrated circuits (ASIC), complex programmable logic devices (CPLD), or the like.

By way of example, in the former case, running all the preprocessing tasks on CPU limits the ability to use any idle resources that might be available on other accelerating devices. In the latter case, if the target accelerating device for certain preprocessing task is predefined (settled upon in some fashion prior to runtime), it may result in a resource contention. The resource contention stems from the fact that the accelerating device resources, such as GPU, NPU, and other device accelerators might be shared among by training data preprocessing pipeline 304 and AI training pipeline 308. Therefore, if the preconfigured task is utilizing too much of these resources, there are chances that it might slow down AI training pipeline 308 which defeats the purpose of using heterogeneous computation resources such as the accelerating device resources along with the CPU to speed up the overall training process. In other words, the existing AI training frameworks that support heterogeneous data preprocessing computation lacks the ability to avoid conflict with the training pipeline.

With this said, there is an interest in developing systems and methods that offer flexibility in computation resource utilization and hence enhancing the over all performance of an AI training framework.

Figure 4:
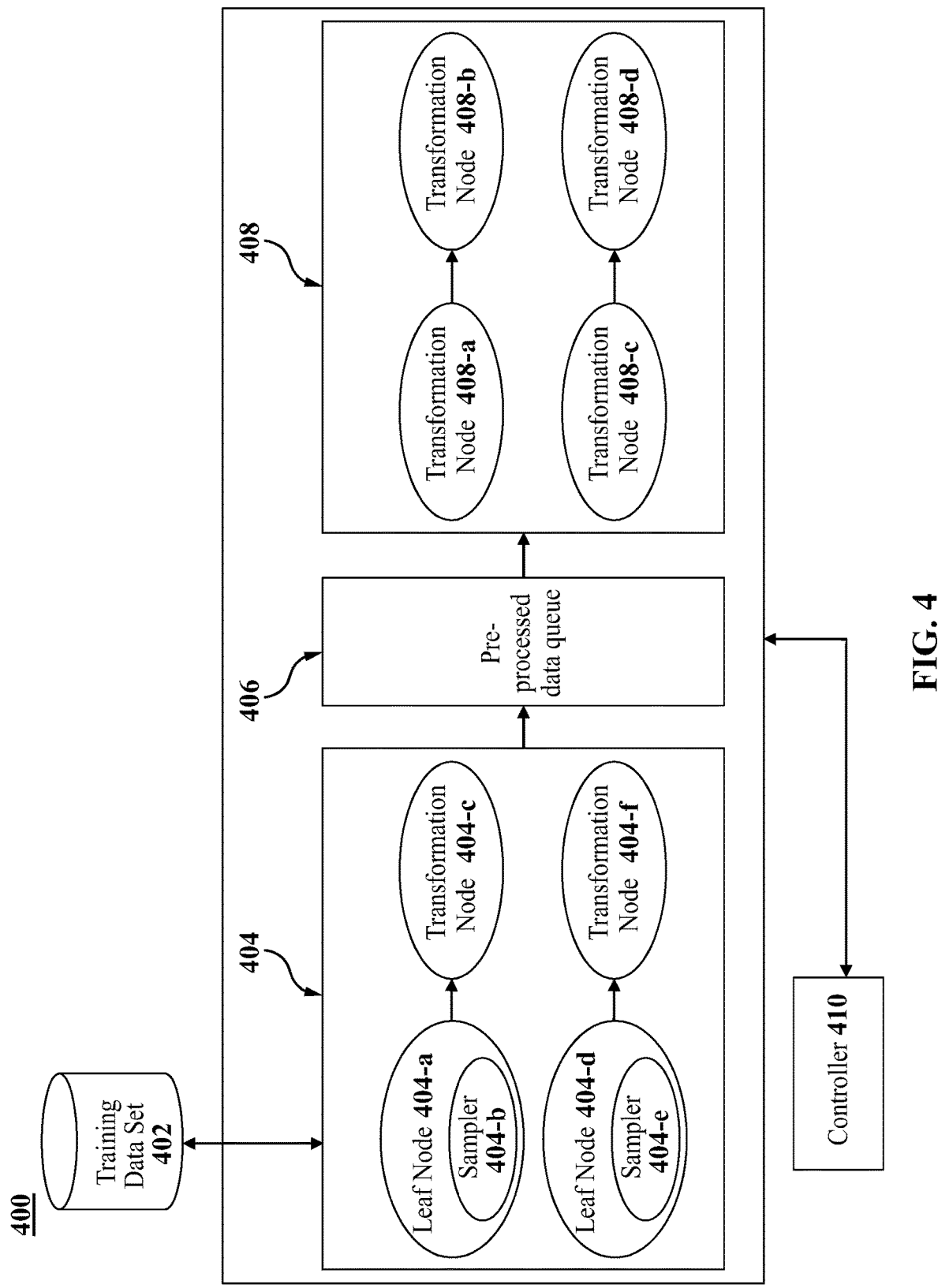
FIG. 4 illustrates a high-level functional block diagram of heterogeneous computing based intelligent AI training framework, in accordance with various embodiments of present disclosure.

FIG. 4 illustrates a high-level functional block diagram of heterogeneous computing based intelligent AI training framework 400, in accordance with various embodiments of present disclosure. As shown, intelligent AI training framework 400 includes a training data set 402, a training data preprocessing pipeline 404, a preprocessed data queue 406, and an AI training pipeline 408, and a controller 410. It is contemplated that intelligent caching system 400 may include other components, elements, and/or modules but have not illustrated for the purpose of simplicity.

In certain embodiments, intelligent AI training framework 400, the associated modules, components, and pipelines may be implemented on client device 110. In other embodiments, intelligent AI training framework 400 and the associated modules, components, and pipelines may be implemented on server 114. In yet another embodiment, some of the modules, components, and pipelines of intelligent AI training framework 400 may be implemented on client device 110 while other modules, components, and pipelines may be implemented on server 114. It is contemplated that where intelligent AI training framework 400 has been implemented should not limit the scope present disclosure.

The training data set 402 may be arranged as a database and may comprise of training data elements. The training data elements may include, but is not limited to, audiovisual (such as images, movies, sound records, presentations, etc.), data (such as location data, numerical data, etc.), text (opinions, comments, questions, messages, etc.) or the like. The type of training data elements should not limit the scope of present disclosure.

Further, the training data elements may have different formats. By way of example, the training data elements may exist in a directory structure like Path/dogs/poodle.jpg, Path/dogs/retriever.jpg, Path/cats/tabby.jpg, Path/cats/lion.jpg or the like. In another example, the training data elements may be encoded in an enormous binary file with a raw data and a label file such as Path/huge_data_file_with_many_images.dat and Path/label_info.dat.

The training data preprocessing pipeline 404 may include multiple numbers of pipelines to process the training data samples present in training data set 402. For the purpose of simplicity, two pipelines have been illustrated in training data preprocessing pipeline 404. The first pipeline may include a leaf node 404-*a*, and a transformation node 404-*c* and the second pipeline may include a leaf node 404-*d* and a transformation node 404-*f*.

The leaf nodes 404-*a* and 404-*d* may communicate with training data set 402 to fetch the training data to be preprocessed. In certain embodiments, leaf node 404-*a* further includes a sampler 404-*b* and leaf node 404-*d* further includes a sampler 404-*e*. The sampler 404-*b*, and 404-*e* may be configured to shard the training data prior to preprocessing. The transformation nodes 404-*c* and 404-*f* may be configured to preprocess the sharded training data samples and store the preprocessed data samples in preprocessed data queue 406.

The preprocessed data queue 406 may include suitable memory elements to store the preprocessed data samples. In certain embodiments, the preprocessed data samples may be stored as a data structure.

Further, each pipeline in training data preprocessing pipeline 404 may include multiple transformation nodes but for the purpose of simplicity only one transformation node per pipeline has been illustrated. After fetching the training data from training data set 402 and in certain embodiments sharding the training data, the leaf nodes 404-*a* and 404-*b* may supply the training data to transformation nodes 404-*c* and 404-*f*.

The transformation nodes 404-*c* and 404-*f* may perform various operations such as for example, decode: output format (RGB), resize: width, height, interpolation mode, crop: x1, y1, x2, y2 (coordinates x, y), CenterCrop, rotate: angle, normalization and so on over the training data. The set of transformation operations may also refer to as a set of tensor operations applied on the training data (also referred to as tensors).

Once the training data (tensors) arrives at transformation nodes 404-c and 404-f, controller 410 and/or transformation nodes 404-c and 404-f may be configured to make a decision by generating resource computation jobs, based on monitoring data (discussed below), whether to perform the transformation on CPU or accelerating device (e.g., GPU, NPU or the like) or a combination of CPU and accelerating devices i.e., heterogenous computing. For example, controller 410 might decide to perform decoding on CPU, Resize and CenterCrop operation on GPU, and Normalization on CPU again.

Figure 5:
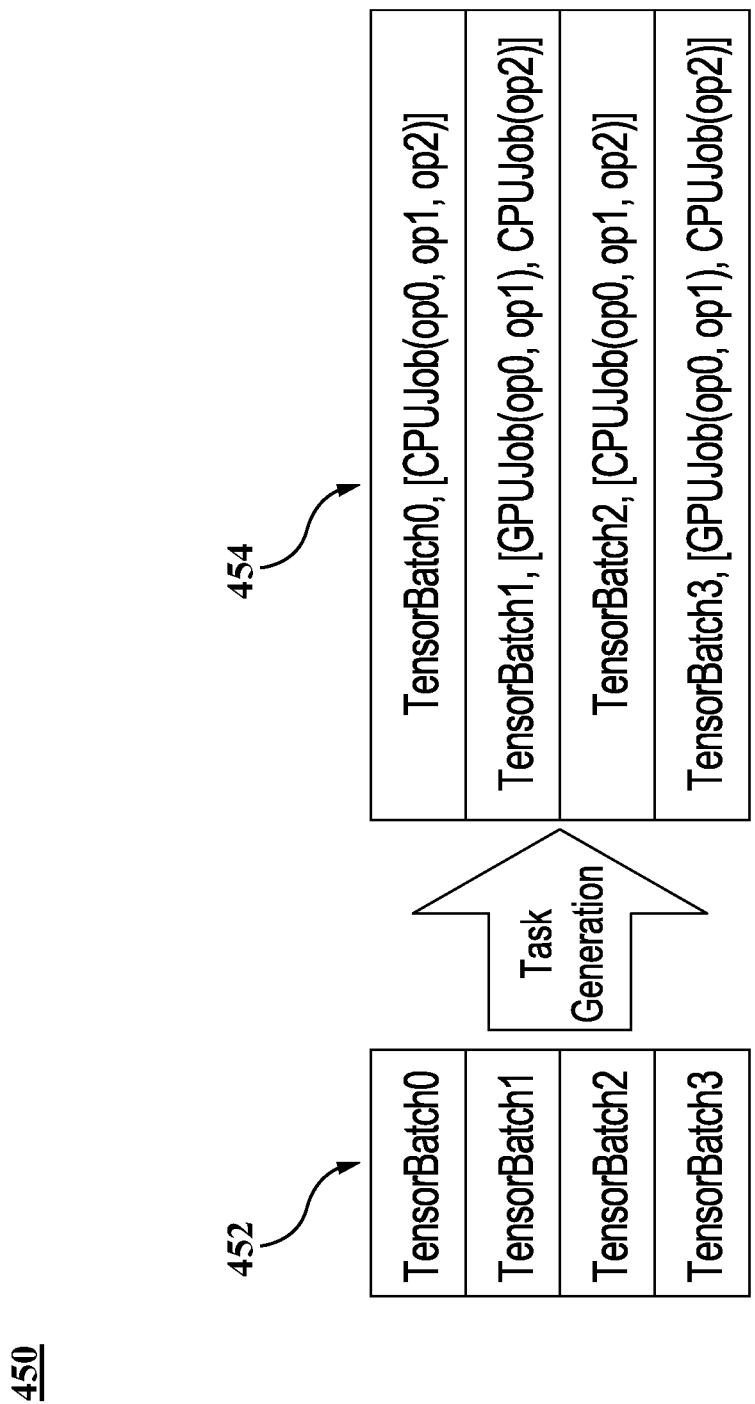
FIG. 5 illustrates an example of diversification of resource utilization, in accordance with various embodiments of present disclosure.

FIG. 5 illustrates an example 450 of diversification of resource utilization, in accordance with various embodiments of present disclosure. As shown, example includes a plurality of sets of training data (tensor) 452. Each of the set of training data (tensor) in the plurality of sets of training data (tensor) 452 may include a plurality of tensors. Let the operations to be performed on plurality of sets of training data (tensor) 452 be represented as OP0, OP1, and OP2. Depending on the availability of computation resources (e.g., CPU and accelerating devices), plurality of sets of training data (tensor) 452 may be processed using intelligent heterogeneous computation. For example, for TensorBatch0 all of the operations OP0, OP1, and OP2 may be processed by a CPU, for TensorBatch1 operations OP0 and OP1 may be performed by a GPU and operation OP2 may be performed by the CPU, for TensorBatch0 all of the operations OP0, OP1, and OP2 may be processed by the CPU, and for TensorBatch1 operations OP0 and OP1 may be performed by the GPU and operation OP2 may be performed by the CPU. Thus, by virtue intelligent heterogeneous computation, intelligent AI training framework 400 may be capable of performing dynamic heterogeneous computation by adapting to the changing status of the computation resources (e.g., CPU and accelerating devices) while generating resource computation jobs. Details of which will be discussed in the following discussion.

Returning to FIG. 4, in certain embodiments without limiting the scope of present disclosure, resource computation jobs may be generated by controller 410 or by transformation nodes 404-c and 404-f. Basically, the resource computation jobs may be referred to as which computational resource is responsible for performing the assigned transformation operation on the training data. In other words, the resource computation jobs may include a portion of training data and one or more operations to be performed on the portion of data. In some embodiments, if a user has specified prior to runtime that certain tensor operations have to be performed by a particular computation resource, then such user instructions may be prioritized while generating resource computation jobs.

Further, the resource computation jobs may be generated based on the percentage of resource utilization monitored by controller 410. When a computation resource utilization is low, more resource computation jobs may be generated for that particular computation resource.

In certain embodiments, the resource computation jobs may further rely on temporal average of the occupancy of preprocessed data queue 406 between training data preprocessing pipeline 404 and AI training pipeline 408 as shown in the equation below:

$$Occ(P) = \frac{\sum_{i=0}^{k} Occ(i)}{k} \quad (1)$$

Where, the temporal average of the occupancy Occ(P) may be the average of number of preprocessed data samples in preprocessed data queue 406 within the last P units of time, Occ(i) may represent the preprocessed data samples in preprocessed data queue 406 at the ith instant of time, $$k = \frac{P}{t_s},$$

and $t_s$ may be the interval between i−1 and ith instant of time.

It is to be noted that it may be often the case when AI training pipeline 408 may be slower than training data preprocessing pipeline 404 due to the complexity of the computation in the training pipeline. However, more resource computation jobs may be generated whenever the average occupancy Occ(P) drops below 1, i.e., there may be some time wasted by AI training pipeline 408 waiting for the data from training data preprocessing pipeline 404.

In certain embodiments, controller 410 may be configured to communicate with preprocessed data queue 406 to determine the occupancy Occ(i) and hence compute the average occupancy Occ(P). Further in certain embodiments, controller 410 may be configured to communicate with the accelerating devices (e.g., GPU, NPU or the like) to determine their utilization factor. It is to be noted that how controller 410 communicate with the accelerating devices and determine their utilization factor should not limit the scope of present disclosure.

Among other operational parameters, in certain embodiments, the monitoring data may include occupancy rate such as, the average occupancy Occ(P) of preprocessed data queue 406 and utilization factor of the accelerating devices (e.g., GPU, NPU or the like).

In case, the resource computation jobs are generated by transformation nodes 408-c and 404-f, controller 410 may provide the monitoring data to transformation nodes 408-c and 404-f. Based on the user's instruction to perform a particular transformation operation by a particular computational resource, the monitoring data, and the tensor operation availability, transformation nodes 408-c and 404-f may generate the resource computation jobs.

Figure 6:
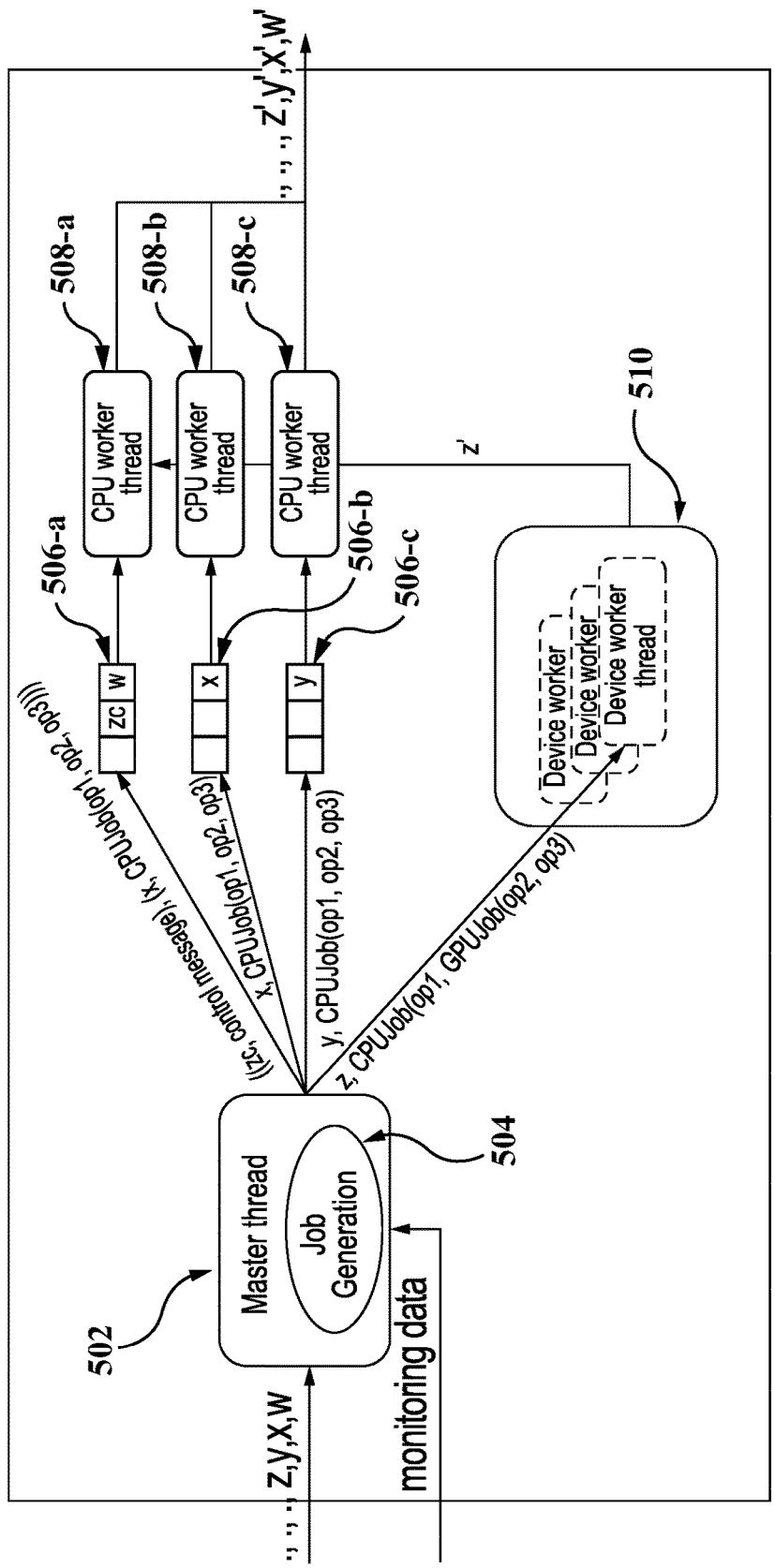
FIG. 6 illustrates a high-level functional block diagram of intelligent heterogeneous computation process implemented on transformation nodes, in accordance with various embodiments of the present disclosure.

FIG. 6 illustrates a high-level functional block diagram of intelligent heterogeneous computation process 500 implemented on transformation nodes 408-c and 404-f, in accordance with various embodiments of the present disclosure. It is to be noted that the following discussion will be w.r.t one transformation node, however, it should be equally applicable to all the transformation nodes in training data preprocessing pipeline 404. As shown, intelligent heterogeneous computation process 500 may include a master thread 502, CPU worker queues 506-a, 506-b, and 506-c, CPU worker threads 508-a, 508-b, and 508-c, and accelerating device worker threads 510. The master thread 502 may further include a job generation module 504. It is to be noted that intelligent heterogeneous computation process 500 illustrated in FIG. 6 is merely an example and should not limit the scope of the present disclosure based of the associated elements discussed above. Rather, in various embodiments, various changes may be performed as per system requirements and intelligent heterogeneous computation process 500 may include some additional elements.

Such elements have been removed from the FIG. 6 for the purpose of simplicity. In certain embodiments, the functionality of intelligent heterogeneous computation process 500 may explained with the help of processes 600, 700, and 800, without limiting the scope of present disclosure.

Figure 7:
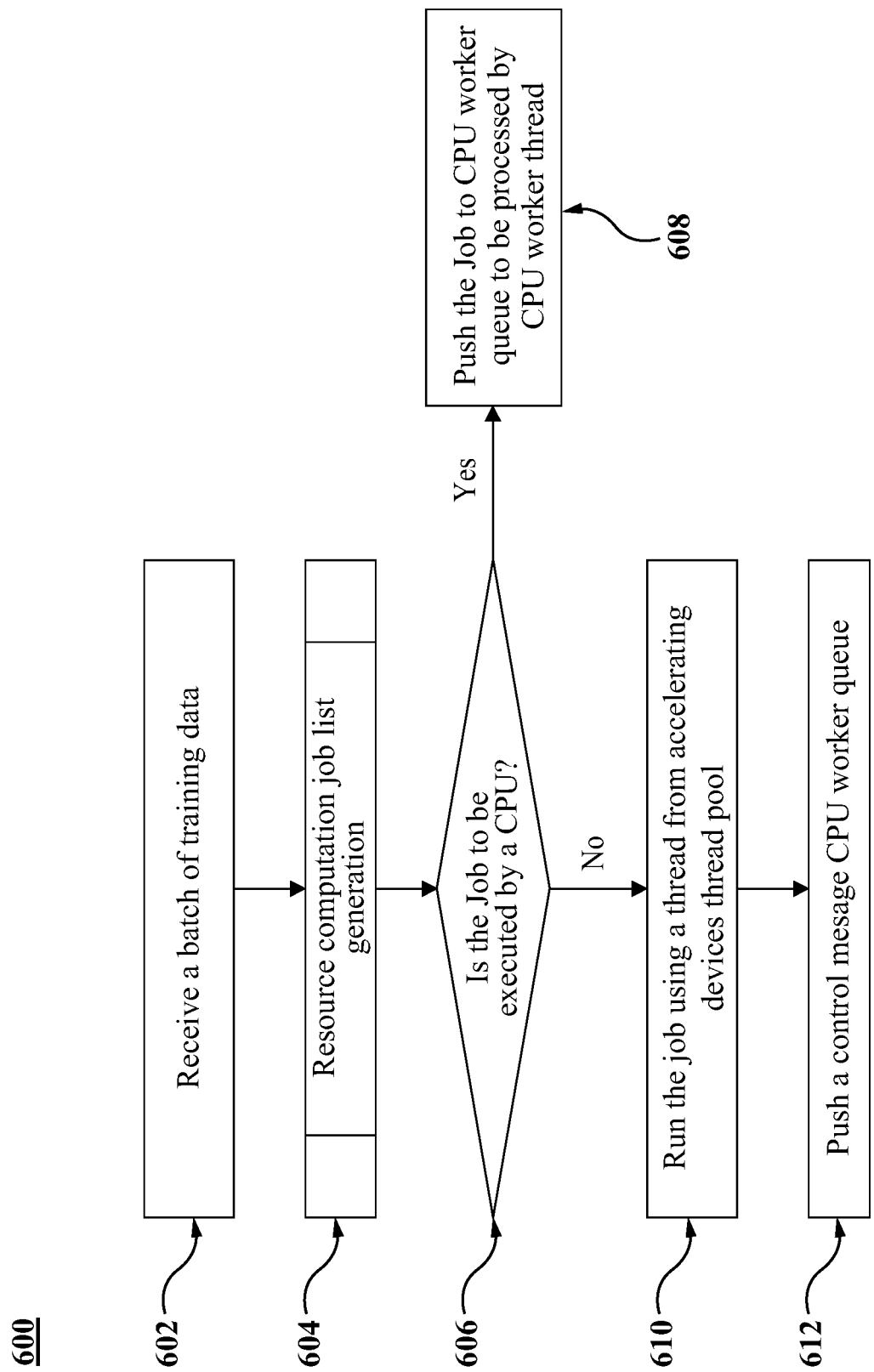
FIG. 7 depicts a flowchart representing a process corresponding to a method for intelligent heterogeneous computation, in accordance with various embodiments of the present disclosure.

FIG. 7 depicts a flowchart representing a process 600 corresponding to a method for intelligent heterogeneous computation, in accordance with various embodiments of the present disclosure. As shown, process 600 commences at step 602 where master thread 502 receives a set of training data from leaf node 404-a. As previously discusses, leaf node 404-a may be configured to communicate with training data set 402 to fetch training data samples. In some embodiments, sampler 304-b may be configured to shard the training data samples prior to providing them to the master thread 502.

The process 600 advances to step 604 where master thread 502 generates a list of resource computation jobs to be performed on the set of training data in accordance with the monitoring data. The list of resource computation jobs may include an information that may include a list of jobs and the corresponding computational resources onto which the jobs are to be executed. The computational resources may include CPU and accelerating devices. In other words, which training data should be processed by which computation resource (CPU or accelerating device) and what operations are to be performed on the training data. An example of a process of resource computation job generation may be discussed with the help of process 700 as illustrated in FIG. 8.

Figure 8:
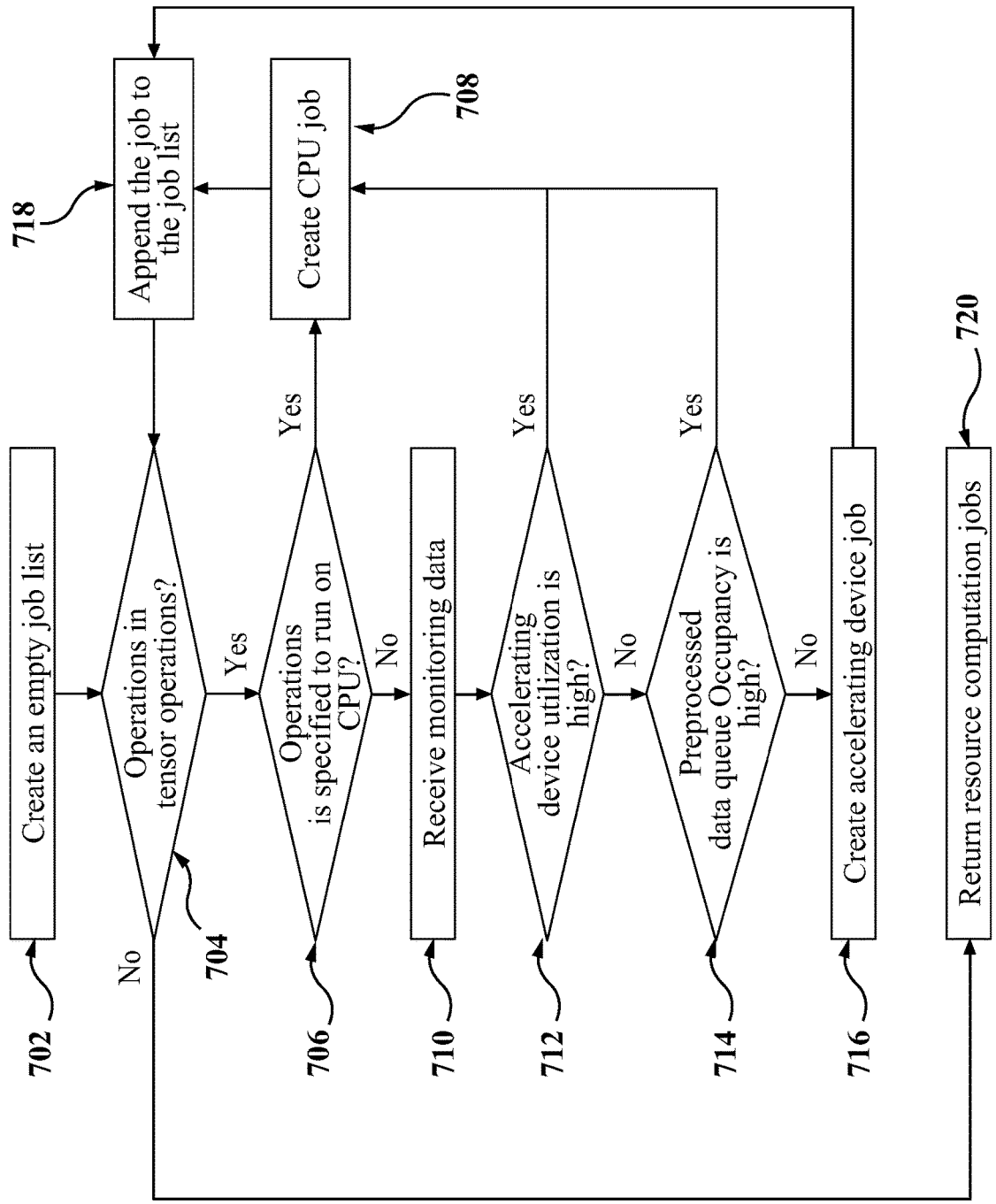
FIG. 8 depicts a flowchart representing a process corresponding to a method for generating a list of resource computation jobs, in accordance with various embodiments of the present disclosure.

FIG. 8 depicts a flowchart representing a process 700 corresponding to a method for generating a list of resource computation jobs, in accordance with various embodiments of the present disclosure. In certain embodiments, process 700 may be implemented by job generation module 504. The job generation module 504 may be implemented using memory elements storing instructions to be executed by one or more processors. As shown, process 700 begins at step 702, where job generation module 504 creates an empty job list. In certain embodiments, job generation module 504 may create an empty job list, in a non-limiting example, the empty job list may be in the form of a data structure that may include some fields (which are initially empty and may not contain any information) related to data to be preprocessed, the operations to be performed on the data, and the computational resource to be used for preprocessing the data.

The process 700 proceeds to step 704, where job generation module 504 traverses a list of tensor operations to be performed on the set of training data and verifies if all the operations in the list of tensor operations have been assigned as a job or not. If there is a pending operation in the list of tensor operations, process 700 moves to step 706 else process 700 moves to step 720. At step 706, job generation module 504 inspects that if a particular operation in the list of tensor operations is specified to be executed by a CPU or it may be executed by any available resource. In case a specific operation in the list of tensor operations is to be performed by a CPU, then process 700 moves to step 708. If there is no specific computational resource requirement, then process 700 moves to step 710.

At step 708, job generation module 504 creates a CPU job corresponding to the operation in the list of tensor operations to be executed by the CPU. From here, process 700 proceeds to step 718. At step 718, job generation module 504 append the CPU job to the job list to update (e.g., establish or modify) the job list and the control of process 700 returns to step 704 and the process 700 is repeated as above.

At step 710, job generation module 504 receives the monitoring data. In certain embodiments, job generation module 504 may receive the monitoring data from controller 410. In other embodiments, master thread 502 may receive the monitoring data from controller 410. As previously noted, that controller 410 may be configured to collect the monitoring data and manage the monitoring data.

The process 700 moves to step 712 where job generation module 504 fetches a status regarding the utilization factor of the acceleration devices from the monitoring data. In case the utilization factor is above a threshold, process 700 advances to step 708, otherwise, process 700 advances to step 714. At step 708, job generation module 504 creates a CPU job corresponding to the operation in the list of tensor operations to be executed by either by the CPU or by any accelerating device, however, due to high utilization of the accelerating devices by AI training pipeline 408, the operation may be executed by the CPU. As noted above, controller 410 may be configured to communicate with the accelerating devices to acquire their utilization factor/status.

In certain embodiments, without limiting the scope of present disclosure, the utilization factor may be represented in terms of percentage of utilization of capacities of the accelerating devices. By way of example, if a particular accelerating device e.g., GPU is operating at 80% of its capacity, then the utilization factor may be considered as high and the GPU may not be utilized for preprocessing operations. On the other hand, if the GPU is operating at 30% of its capacity, then the utilization factor may be considered as low and the GPU may be utilized for preprocessing operations.

From here, process 700 proceeds to step 718. At step 718, job generation module 504 append the CPU job to the job list to update the job list and the control of process 700 returns to step 704 and the process 700 is repeated as above.

At step 714, job generation module 508, fetches a status regarding the occupancy rate of preprocessed data queue 406 from the monitoring data. In case the occupancy rate of preprocessed data queue 406 is above a threshold, process 700 advances to step 708, otherwise, process 700 advances to step 716. At step 708, job generation module 504 creates a CPU job corresponding to the operation in the list of tensor operations to be executed by either by the CPU or by any accelerating device, however, due to occupancy of preprocessed data queue 406, the operation may be executed by the CPU. As noted above, controller 410 may be configured to communicate with occupancy of preprocessed data queue 406 to compute its occupancy. In certain embodiments, the computed occupancy may be a temporal average occupancy of preprocessed data queue 406.

In certain embodiments, the occupancy rate of preprocessed data queue 406 may be represented as a ratio of a number of preprocessed training data elements present in preprocessed data queue 406 to the maximum number of preprocessed training data elements that may be present in the preprocessed data queue 406. By way of example, if the number of preprocessed training data elements present in preprocessed data queue 406 is almost equal to the maximum number of preprocessed training data elements that may be present in the preprocessed data queue 406 (i.e., equal to the storage capacity of preprocessed data queue 406), in this case the occupancy rate may be almost equal to one. Such a scenario represents that either a rate with which AI training pipeline 408 is fetching preprocessed training data from preprocessed data queue 406 is almost similar or a slower rate with which training data preprocessing pipeline 404 is storing the preprocessed training data in preprocessed data queue 406. In this situation, the accelerating devices may not be utilized for preprocessing operations. Since, the accelerating devices may already be busy in performing training tasks.

On the other hand, if the number of preprocessed training data elements present in preprocessed data queue 406 is very less than the maximum number of preprocessed training data elements that may be present in the preprocessed data queue 406 (i.e., less than the storage capacity of preprocessed data queue 406), in this case the occupancy rate may be less than one. Such a scenario represents that a rate with which AI training pipeline 408 is fetching preprocessed training data form preprocessed data queue 406 may be faster as compared to the rate which training data preprocessing pipeline 404 is storing the preprocessed training data in preprocessed data queue 406. In this situation, the accelerating devices may be utilized for preprocessing operations to avoid a non-limiting scenario where preprocessed data queue 406 may not have enough preprocessed training data to be processed by training data preprocessing pipeline 404.

It is to be noted that, in some embodiments, the thresholds associated with utilization factor and occupancy rate to decide whether a CPU or the accelerating devices to be used for a preprocessing operation may be predefined (e.g., settled upon prior to start of the preprocessing operations) and may depend upon the system requirements. While in other embodiments, the threshold may be decided during runtime. Although, in the examples discussed above, the utilization factor has been represented in terms of percentage, and occupancy rate has been represented as a ratio of a number of preprocessed training data elements present in preprocessed data queue 406 to the maximum number of preprocessed training data elements that may be present in the preprocessed data queue 406, however, any other suitable representation may be employed without drifting from the principles presented in the present disclosure.

From here, process 700 proceeds to step 718. At step 718, job generation module 504 append the CPU job to the job list to update the job list and the control of process 700 returns to step 704 and the process 700 is repeated as above.

If the utilization factors of accelerating devices are below a certain threshold and the occupancy of preprocessed data queue 406 is also below a certain threshold, at step 716, job generation module 504 creates an accelerating device job corresponding to the operation on the list of tensor operations to be performed on the training data by the accelerating device. From here, process 700 proceeds to step 718. At step 718, job generation module 504 append the accelerating job to the job list to update the job list and the control of process 700 returns to step 704 and the process 700 is repeated as above.

When all of the operations in the list of tensor operations have been traversed, process 700 advances to step 720. Finally, at step 720, job generation module 504 returns the job list specifying which operation is to be executed on which computation resource to process 600.

Returning to FIG. 7, upon receiving the job list from process 700 at step 604, process 600 advances to step 606. At step 606, master thread 502 traverses the job list, if a job is to be executed by the CPU, process 600 advances to step 608 and if a job is to be executed by the accelerating devices, process 600 advances to step 610.

At step 608, master thread 502 pushes (sends, e.g., by forwarding or transmitting; these terms are largely used interchangeably) the job to CPU worker queues 506-a, 506-b, and 506-c to be processed CPU worker threads 508-a, 508-b, and 508-c. The CPU worker queues 506-a, 506-b, and 506-c may include suitable memory elements to store the jobs. In certain embodiments, the jobs may be stored as a data structure.

At step 610, master thread 502 instructs the accelerating device to execute the job and forwards the job to accelerating device worker threads 510. Finally, at step 612, master thread 502 pushes (e.g., forwarding, sending, transmit or the like) a control messages to one of CPU worker queues 506-a, 506-b, and 506-c. The control messages may be associated with the jobs in the resource computation job list to be executed the accelerating devices specifying that a particular job may be executed by the accelerating devices.

Figure 9:
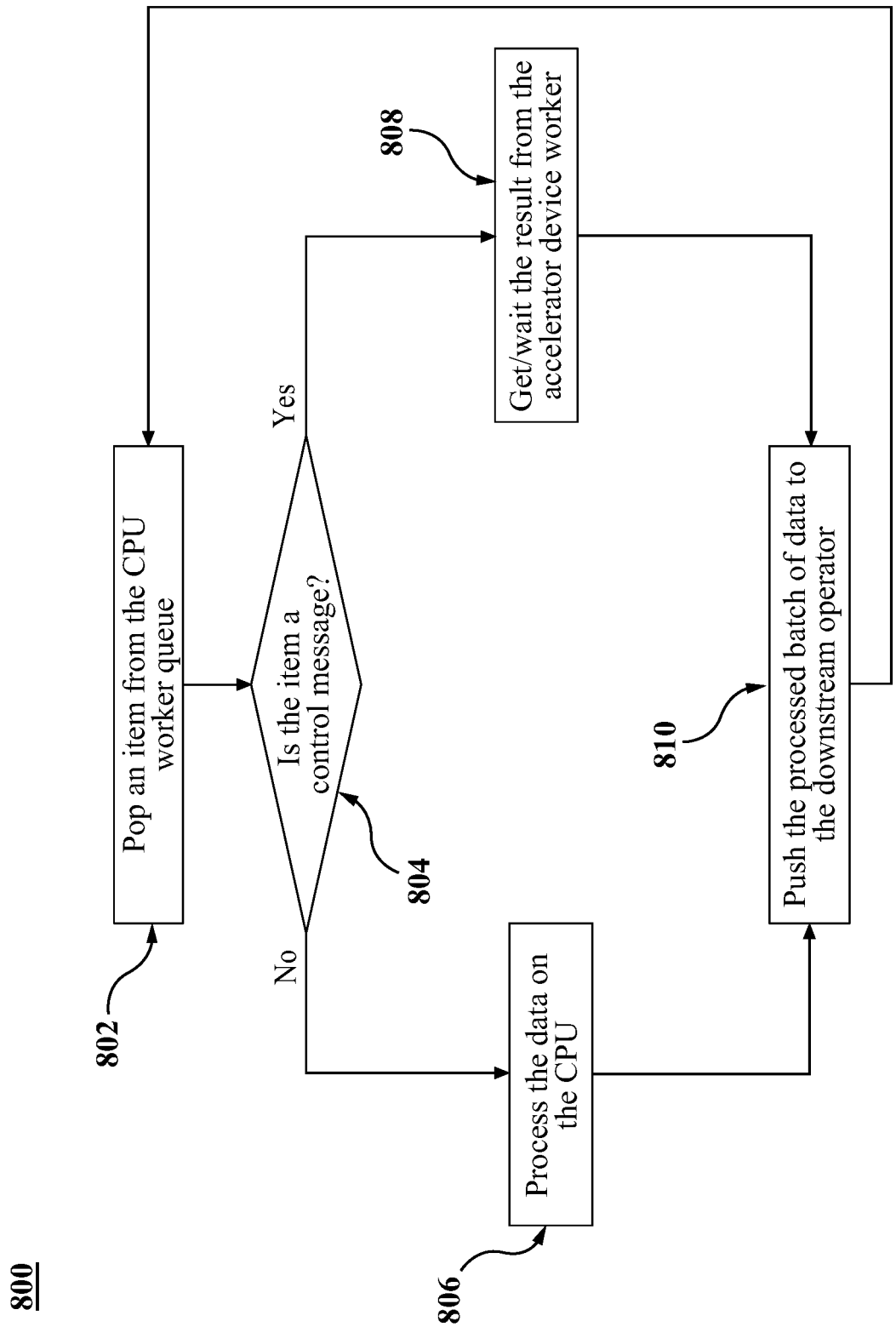
FIG. 9 depicts a flowchart representing a process corresponding to a method for executing preprocessing operations, in accordance with various embodiments of the present disclosure.

FIG. 9 depicts a flowchart representing a process 800 corresponding to a method for executing preprocessing operations, in accordance with various embodiments of the present disclosure. As shown, process 800 commences at step 802 where CPU thread workers 508-a, 508-b, and 508-c extracts (e.g., pop, fetch, select or the like) items from CPU worker queues 506-a, 506-b, and 506-c.

The process 800 moves to step 804, where CPU thread workers 508-a, 508-b, and 508-c verifies a status of the popped items. In case, the popped item is a control message, process 800 moves to step 808 else if, the popped item is a job, process 800 moves to step 806.

At step 806, CPU thread workers 508-a, 508-b, and 508-c executes (processes) the operations specified by the jobs popped from CPU worker queues 506-a, 506-b, and 506-c. The processing may include applying one or more operations on the training data specified in the job and generating processed training data and process 700 advances to step 810.

At step 808, CPU thread workers 508-a, 508-b, and 508-c either wait for the training data to be executed by the accelerating devices or receive the training data already processed by the accelerating devices. Finally, at step 810, CPU thread workers 508-a, 508-b, and 508-c combine and forward the preprocessed set of training data to the downstream operators. The preprocessed set of training data may include the training data processed by the CPU the training data processed by the accelerated devices. In one example, training data preprocessing pipeline 404 forwards the preprocessed training data preprocessed data queue 406.

Returning to FIG. 6, thus by virtue of intelligent heterogeneous computation process 500, the computational resources may not be limited to preconfigured targets, rather a decision to select a particular computational resource may be taken during runtime. Once a preprocessing job is decided to be executed on a particular computational resource, intelligent heterogeneous computation process 500 may allow parallel execution of those jobs with other existing and future jobs that may be running on different computational resources. For example, CPU computation of the same operation (e.g., image rotation) may be parallelized with accelerating device computation of the operation. Unlike other frameworks which could only select either CPU or accelerating device, intelligent heterogeneous computation process 500 may allow the same operation to be executed on both CPU and/or accelerating devices at the same time in parallel.

By way of example, initially, master thread 502 may be configured to receive or pull training data (e.g., the training data w, x, y, and z) from the upstream operators such as for example, leaf node 404-a and an execute process 700 performs to generate a list of different type of jobs, e.g., CPU Job, GPU Job, and other accelerating device jobs based on user instructions, monitoring data, and a list of tensor operations.

The master thread 502 may forward the training data along with the operations to be performed on the training data into CPU worker queues 506-a, 506-b, and 506-c to be processed on CPU by CPU thread workers 508-a, 508-b, and 508-c. Such as for example, master thread 502 may push the training data w, x, and y along with the operations to be performed on the training data w, x, and y to CPU worker queues 506-a, 506-b, and 506-c.

At the same time, if a job is to be executed by an accelerating device, master thread 502 may pickup a thread from accelerating device worker threads 510 and may hand over the job to that thread to be executed by the accelerating device as soon as possible. Such as for example, master thread 502 may push the training data z along with the operations to be performed on the training data to the selected thread from accelerating device worker threads 510.

In addition to handing the training data z and its job list over to the selected thread from accelerating device worker threads 510, in certain embodiments, master thread 502 may also pushes a control message zc into CPU worker queues (e.g., 506-a), and when by CPU thread workers (e.g., 508-a) reads this control message, it understands that this job does not need to be executed on CPU, but instead simply grab the result from the selected thread from accelerating device worker threads 510 output (e.g., the training data z'). Therefore, intelligent heterogeneous computation process 500 allows parallel computation of data w, x and y on the CPU, and data z on an accelerating device at the same time.

Further, in certain embodiments, out of multiple operations to be performed on same training data, some of the operation may be executed on CPU while other operations may be executed by accelerating device. By way of example, the operations to be performed on the training data includes OP1, OP2, and OP3. The job operation module 504 identifies that that operation OP1 may be executed by CPU and operations OP2 and OP3 may be executed by accelerating device. In such scenario, master thread 502 may push a control message (instructing to wait/read the processed data from the accelerating device) to CPU worker queues 506-a. Also, master thread 502 may forward the training data z and the job (specifying that operation OP1 is to be executed by the CPU and operation OP2 and OP3 are to be executed by the accelerating device) to a selected thread from accelerating device worker threads 510. The selected thread from the accelerating device worker threads 510, may communicate with the CPU to perform operation OP1, provides the output of CPU to an accelerating device to perform remaining operations OP2 and OP3.

The intelligent heterogeneous computation process 500 may be able to monitor the status of each computation resources and identify some idle resources where some preprocessing jobs could be executed on. In addition to that, the preprocessing job generation process may be performed dynamically at runtime which helps in identifying idle resources that might not be seen before runtime. As a result, intelligent heterogeneous computation process 500 may be able to delegate preprocessing jobs into the idle resources at runtime and execute multiple preprocessing jobs in parallel across multiple computational resources, thus achieving better utilization across the heterogeneous computing resources that leads to faster overall AI training process. In general, the higher resource utilization means the more work is performed, and the faster AI training process will finish.

The intelligent heterogeneous computation process 500 may eliminate the hard requirement of hand-tuning effort of the system prior to runtime. The intelligent heterogeneous computation process 500 may not only be able to make use of the idle computational resources, but also able to make runtime decisions achieving automatic load-balancing and equilibrium state between data preprocessing pipeline and training pipeline.

It is also worthwhile to note that unlike the other existing frameworks, intelligent heterogeneous computation process 500 may not over burden the computational resources that are already busy and does not require prior tuning or deep knowledge about the resource usage pattern of the training pipeline due to our dynamic intelligent and effective resource computation job generation.

It will be appreciated that although the discussion in the present disclosure is for AI pipeline. However, it is conceivable that the teachings of the present disclosure may be equally applicable to any other software frameworks that are implemented as a pipeline of connected workers. It does not technically have to be an application of preparing the data for training in AI.

It is to be understood that the operations and functionality of environment 100, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method of parallel preprocessing of training data executable by a processor, the method comprising:
receiving monitoring data and a set of training data, the monitoring data including an occupancy rate of a preprocessed data queue and a utilization factor of an accelerating device;
generating a resource computation job list using the occupancy rate and the utilization factor, the resource computation job list including a first job and a second job, the first job comprising a first portion of the training data and one or more first portion tensor operations to be performed on the first portion of the training data, the second job comprising a second portion of the training data and one or more second portion tensor operations to be performed on the second portion of the training data, the generating comprising:
assigning the first job to a central processing unit (CPU) after determining that:
the one or more first portion tensor operations include an indication that the one or more first portion tensor operations are to be performed by the CPU, the utilization factor of the accelerating device is above a first threshold, or the occupancy rate of the preprocessed data queue is above a second threshold; and assigning the second job to the accelerating device after determining that:
no second portion tensor operation in the one or more second portion tensor operations includes an indication that a respective second portion tensor operation of the one or more second portion tensor operations is to be performed by the CPU;

the utilization factor of the accelerating device is below the first threshold; and the occupancy rate of the preprocessed data queue is below the second threshold;

forwarding the first job assigned to the CPU to a CPU worker queue of the CPU;

forwarding a control message to the CPU worker queue, the control message being associated with the second job assigned to the accelerating device, the control message indicating that the second job is to be executed by the accelerating device; and executing the second job on the accelerating device.

2. The method of claim 1, further comprising:

extracting an item from the CPU worker queue;

if the extracted item is the first job assigned to the CPU, processing the extracted item by the CPU, the processing including executing the one or more first portion tensor operations, thereby generating first processed training data;

if the extracted item is the control message, receiving second processed training data from the accelerating device;

combining, by the CPU, the first processed training data and the second processed training data, thereby generating a combined processed training data; and forwarding the combined processed training data to the preprocessed data queue to make the combined processed training data available for other processing units.

3. The method of claim 1, wherein the resource computation job list includes a list of jobs and corresponding computational resources onto which the list of jobs are to be executed.

4. The method of claim 3, wherein the corresponding computational resources include the CPU and the accelerating device.

5. The method of claim 1, wherein the accelerating device includes one or more of a graphic processing unit (GPU), a digital signal processor (DSP), a neural processing unit (NPU), a tensor processing unit (TPU), a vision processing unit (VPU), physical neural network (PNN), a field-programmable gate array (FPGA), an application-specific integrated circuit (ASIC), and/or a complex programmable logic device (CPLD).

6. The method of claim 1, wherein the occupancy rate is a temporal average of a number of preprocessed training data samples in the preprocessed data queue.

7. A system for parallel preprocessing of training data, comprising:

an accelerating device;

a memory storing instructions; and at least one processor in communication with the memory and in communication with the accelerating device, the at least one processor configured, upon execution of the instructions, to perform the following steps:

receive monitoring data and a set of training data, the monitoring data including an occupancy rate of a preprocessed data queue and a utilization factor of the accelerating device;

generate a resource computation job list using the occupancy rate and the utilization factor, the resource computation job list including a first job and a second job, the first job comprising a first portion of the training data and one or more first portion tensor operations to be performed on the first portion of the training data, the second job comprising a second portion of the training data and one or more second portion tensor operations to be performed on the second portion of the training data, the generating comprising:

assigning the first job to a central processing unit (CPU) after determining that:

the one or more first portion tensor operations include an indication that the one or more first portion tensor operations are to be performed by the CPU, the utilization factor of the accelerating device is above a first threshold, or the occupancy rate of the preprocessed data queue is above a second threshold; and assigning the second job to the accelerating device after determining that:

no second portion tensor operation in the one or more second portion tensor operations includes an indication that a respective second portion tensor operation of the one or more second portion tensor operations is to be performed by the CPU;

the utilization factor of the accelerating device is below the first threshold; and the occupancy rate of the preprocessed data queue is below the second threshold;

forward the first job assigned to the CPU to a CPU worker queue of the CPU;

forward a control message to the CPU worker queue, the control message associated with the second job assigned to the accelerating device, the control message indicating that the second job is to be executed by the accelerating device; and execute the second job on the accelerating device.

8. The system of claim 7, wherein the resource computation job list includes a list of jobs and corresponding computational resources onto which the list of jobs are to be executed.

9. The system of claim 8, wherein the corresponding computational resources include the CPU and the accelerating device.

10. The system of claim 7, wherein the accelerating device includes one or more of a graphic processing unit (GPU), a digital signal processor (DSP), a neural processing unit (NPU), a tensor processing unit (TPU), a vision processing unit (VPU), a physical neural network (PNN), a field-programmable gate array (FPGA), an application-specific integrated circuit (ASIC), and/or a complex programmable logic device (CPLD).

11. The system of claim 7, wherein the occupancy rate is a temporal average of a number of preprocessed training data samples in the preprocessed data queue.

* * * * *